United States Patent
Manabe

(10) Patent No.: US 8,163,063 B2
(45) Date of Patent: Apr. 24, 2012

(54) METHOD OF LEACHING COPPER SULFIDE ORE WITH THE USE OF IODINE

(75) Inventor: Manabu Manabe, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 582 days.

(21) Appl. No.: 12/418,904

(22) Filed: Apr. 6, 2009

(65) Prior Publication Data
US 2010/0018349 A1    Jan. 28, 2010

(30) Foreign Application Priority Data

Jul. 23, 2008   (JP) ................................ 2008-189258

(51) Int. Cl.
- C22B 3/00   (2006.01)
- C22B 3/04   (2006.01)
- C22B 3/06   (2006.01)
- C22B 3/08   (2006.01)
- C22B 15/00  (2006.01)

(52) U.S. Cl. ................ 75/743; 423/27; 423/36; 423/38; 423/658.5

(58) Field of Classification Search .................... 75/743, 75/744; 423/658.1, 150.1, 658.5, 27, 38, 423/36

See application file for complete search history.

(56) References Cited

U.S. PATENT DOCUMENTS

| 4,091,070 A | 5/1978 | Riggs et al. |
| 5,989,311 A * | 11/1999 | Han et al. ........................ 75/743 |
| 2008/0050293 A1 | 2/2008 | Dreisinger et al. |

FOREIGN PATENT DOCUMENTS

GB          394316 A      6/1933

OTHER PUBLICATIONS

Notice of Acceptance issued on Nov. 9, 2011 in corresponding Australian patent application No. 2009201732.
Australian Office Action dated May 19, 2010 for Application No. 2009201732.

* cited by examiner

*Primary Examiner* — Jerry Lorengo
*Assistant Examiner* — Jared Wood
(74) *Attorney, Agent, or Firm* — Birch, Stewart, Kolasch & Birch, LLP

(57) ABSTRACT

An object of the present invention is to provide a method of efficiently leaching copper from a copper sulfide ore containing chalcopyrite or enargite as a main constituent under versatile conditions for actual operation.

A method of leaching copper from a copper sulfide ore, characterized by comprising using, as a leaching solution, a sulfuric acid solution containing iodide ions and ferric (III) ions in an excessive amount relative to the iodide ions and leaching copper from a copper sulfide ore; or a method of leaching copper from a copper sulfide ore, characterized by comprising leaching copper from a copper sulfide ore with the use of a leaching solution further containing water-soluble ligands such as chloride ions that can stabilize ferric (III) ions in addition to the above components, is provided.

8 Claims, 4 Drawing Sheets

METHOD OF LEACHING COPPER SULFIDE ORE WITH THE USE OF IODINE

TECHNICAL FIELD

The present invention relates to a method of efficiently leaching copper from a copper sulfide ore and particularly from a copper sulfide ore comprising ore that is poorly soluble in a mineral acid, such as chalcopyrite or enargite, with the use of iodine.

BACKGROUND ART

In general, examples of known leaching operations for copper sulfide ores via hydrometallurgy include a leaching operation comprising performing an agitated batch reaction with the use of sulfuric acid or hydrochloric acid and a leaching operation (heap leaching method) of forming ore heaps, supplying sulfuric acid or hydrochloric acid to the tops of the ore heaps, and recovering liquid dripping therefrom due to the force of gravity. However, since chalcopyrite and enargite are very poorly soluble in mineral acids, the leaching rate during leaching at an ordinary temperature with the use of such ores is very slow, which is problematic. In addition, at an advanced stage of a leaching reaction, the leaching rate is significantly lowered due to leaching inhibition caused by a coat formed on the ore surface with an iron precipitate and the like, which is also problematic.

Hence, a variety of techniques for increasing the rate for leaching a copper sulfide ore containing chalcopyrite, enargite, or the like as a main constituent with the use of a mineral acid have been suggested. In one reported example, leaching is carried out by adding activated carbon and iron to a leaching solution and maintaining the oxidation-reduction potential (Ag—AgCl reference electrode) at 350 to 450 mV (JP Patent Publication (Kokai) No. 2005-15864 A). Alternatively, methods involving pressurization to an atmospheric pressure or more, heating to 100° C. or more, and the like for leaching have been reported (JP Patent Publication (Kokai) No. 2003-328050 A, JP Patent Publication (Kohyo) No. 2001-515145 A, and JP Patent Publication (Kokai) No. 10-317072 A (1998)). However, such leaching involving heating, pressurizing, or the like is problematic in terms of cost increase, although such leaching is effective for the improvement of the leaching rate.

Meanwhile, examples in which iodine is used as an oxidant for metal leaching have been reported. A typical example of such leaching is a method of producing gold with a high purity comprising dissolving gold in a solution containing an iodine compound comprising, for example, iodine and potassium iodide and carrying out reduction precipitation of gold (JP Patent Publication (Kokai) No. 64-17826 A (1989)). In addition, a method of dissolving a noble metal with the use of a dissolving solution containing at least one organic solvent or the like selected from the group consisting of iodine and/or iodide ions, polyalcohol, polyether, and cyclic lactone has been also reported (JP Patent Publication (Kokai) No. 2005-154892A). However, it is necessary to use iodine ($I_2$) at a high concentration in this method, and thus an organic solvent must be used as a solution for dissolving iodine ($I_2$).

DISCLOSURE OF THE INVENTION

As described above, it is difficult to efficiently carry out copper leaching from a copper sulfide ore containing chalcopyrite or enargite as a main constituent at an ordinary temperature and an atmospheric pressure. Moreover, various factors such as a coating phenomenon caused by an iron precipitate and the like generated during leaching cause a significant decrease in the leaching rate, which is problematic. In addition, it is not practical to carry out a conventionally proposed control of oxidation-reduction potential with the use of a reductant or the addition of a leaching adjuvant comprising silver ions, activated carbon, or the like in terms of environmental burdens and actual operation.

In view of the above circumstances, it is an object of the present invention to provide a method of efficiently leaching copper from a copper sulfide ore containing chalcopyrite or enargite as a main constituent by means of agitated leaching or ore heap leaching under versatile conditions for actual operation.

As a result of intensive studies in order to solve the above problems, the present inventors have found that the copper leaching rate can be significantly improved by using, as a leaching solution, a sulfuric acid solution containing iodide ions and ferric (III) ions in an excessive amount relative to the iodide ions when recovering copper from a copper sulfide ore containing chalcopyrite or enargite by hydrometallurgy. Further, they have found that copper leaching can be efficiently carried out by adding water-soluble ligands such as chloride ions that can stabilize ferric (III) ions in a solution to the above leaching solution so as to prevent leaching inhibition from being caused by an iron precipitate generated during leaching. The above findings have led to the completion of the present invention.

Specifically, the present invention encompasses the following inventions.

(1) A method of recovering copper from copper sulfide ores, characterized by comprising using, as a leaching solution, a sulfuric acid solution containing iodide ions and ferric (III) ions in an excessive amount relative to the iodide ions, and leaching copper from a copper sulfide ore.

(2) The method according to (1), wherein the copper sulfide ore is a copper sulfide ore containing chalcopyrite or enargite as a main constituent.

(3) The method according to (1) or (2), wherein the total iodine concentration derived from iodide ions in the leaching solution and iodine and/or tri-iodide ions generated by oxidation of the iodide ions is 100 to 300 mg/L.

(4) The method according to any one of (1) to (3), wherein the ferric (III) ion content in the leaching solution is 23 to 120 times higher than the iodide ion content therein in terms of weight.

(5) The method according to any one of (1) to (3), wherein the ferric (III) ion content in the leaching solution is 0.6 to 1.8 times higher than the chalcopyrite in the copper sulfide ore in terms of weight.

(6) The method according to any one of (1) to (5), wherein the leaching solution further contains water-soluble ligands that can stabilize ferric (III) ions.

(7) The method according to (6), wherein the water-soluble ligands are chloride ions.

(8) The method according to (7), wherein the chloride ion content in the leaching solution is 0.1 to 2.3 times higher than the ferric (III) ion content therein in terms of weight.

Figure 1:
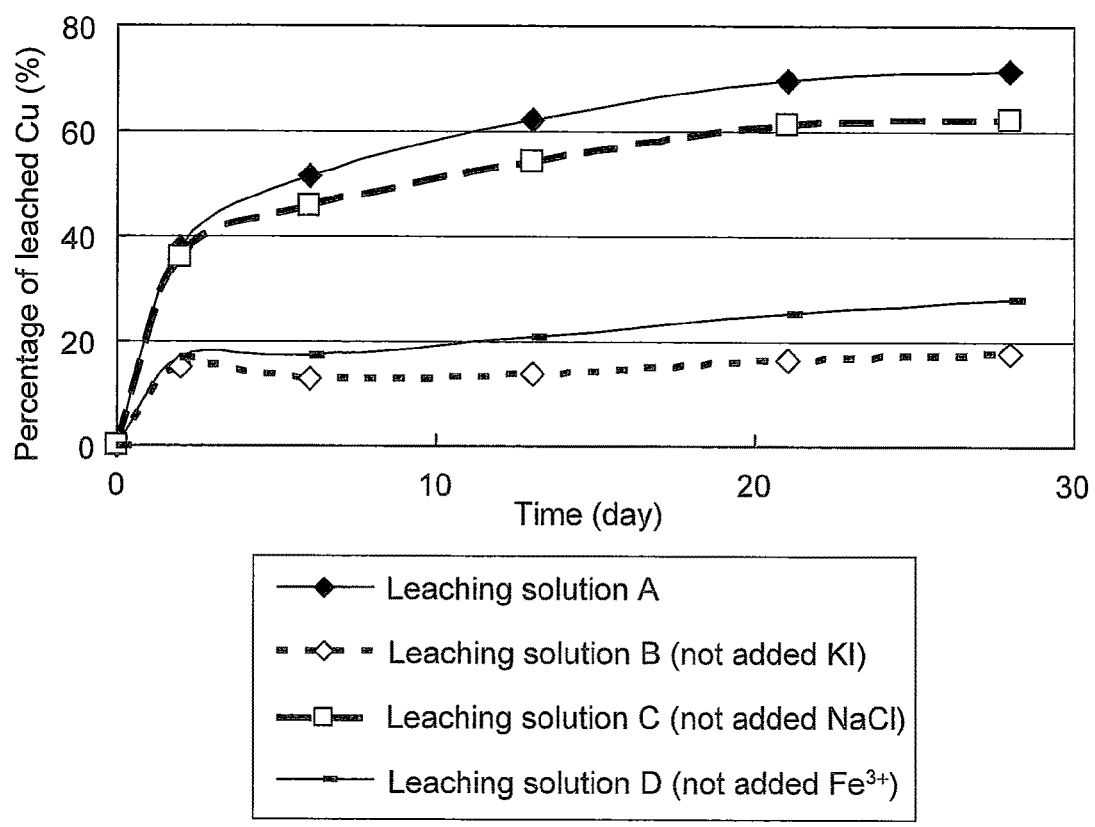
FIG. 1 shows copper leaching promoting effects obtained with the addition of iodine, ferric (III) ions, and chloride ions.

Hereinafter the present invention will be described in detail. The present application claims the priority of Japanese Patent Application No. 2008-189258 filed on Jul. 23, 2008 and encompasses contents described in the specification and/or drawings of the patent application.

The method of leaching copper from a copper sulfide ore of the present invention is characterized in that copper is leached from a copper sulfide ore with the use of a sulfuric acid solution containing iodide ions and ferric (III) ions in an excessive amount relative to the iodide ions as a leaching solution.

Copper sulfide ores containing chalcopyrite or enargite as target ores for the method of the present invention may be copper sulfide ores containing chalcopyrite or enargite as a main constituent or copper sulfide ores that partially contain chalcopyrite or enargite, for example. The chalcopyrite content is not particularly limited. However, in order to obtain sufficient copper leaching effects by the method of the present invention, a copper sulfide ore containing chalcopyrite or enargite as a main constituent is preferable.

When it comes to hydrometallurgy of copper using a sulfuric acid solution as a leaching solution, the method of the present invention can be applied in any types of leaching operations. For example, not only agitated batch leaching but also heap leaching and dump leaching where copper is leached into sulfuric acid by sprinkling sulfuric acid over ore heaps may be optionally adopted. In addition, leaching is carried out at ordinary temperature and does not particularly require heating or the like.

Dissolution/leaching of a copper sulfide ore according to the present invention is thought to proceed by the following series of catalyst reactions (formulae 1 and 2) with iodine.

(formula 1)

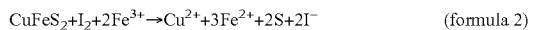
(formula 2)

When the sum of both sides of the above formulae (formulae 1 and 2) is obtained such that the iodine components are eliminated, the following formula (formula 3) is obtained. It is understood that the following formula corresponds to a conventional leaching reaction formula for a leaching of copper sulfide ore by $Fe^{3+}$.

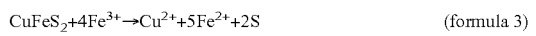
(formula 3)

As described above (formula 2), copper leaching from a copper sulfide ore is carried out via a reaction in which iodine ($I_2$) plays a role as a catalyst. However, iodine is poorly water soluble. Therefore, iodide, which can be readily dissolved in a leaching solution and dissociated into iodide ions, is added to a leaching solution. An iodide that can be used herein is water soluble and generates iodide ions. Examples thereof include sodium iodide, potassium iodide, ammonium iodide, and hydrogen iodide. Potassium iodide is particularly preferable in terms of material cost and handleability.

First, in the above reaction (formula 1), iodide ions ($I^-$) dissociated from an iodide added to a leaching solution are oxidized with ferric (III) ions ($Fe^{3+}$) such that iodine ($I_2$) is generated. In addition, elementary iodine ($I_2$) generated during the reaction reacts with remaining iodide ions ($I^-$) such that tri-iodide ions ($I_3^-$) are also generated in the leaching solution.

The total iodine concentration derived from iodide ions in the leaching solution used in the present invention and iodine and/or tri-iodide ions generated by oxidation of iodide is 100 mg/L or more. However, in view of cost, it is 100 to 300 mg/L and preferably 200 to 300 mg/L. When the iodine concentration falls within the above range, the copper leaching rate is increased and deceleration of leaching does not occur.

Subsequently, in the above reaction (formula 2), a copper sulfide ore is oxidized with iodine ($I_2$) and ferric (III) ions ($Fe^{3+}$) generated in the reaction (formula 1) such that cupric ions ($Cu^{2+}$) are generated. In addition, the above tri-iodide ions ($I_3^-$) also function as catalysts in the reaction (formula 2), as does iodine ($I_2$).

As leaching proceeds, the concentration of iodine or tri-iodide ions playing a role as catalysts in the leaching solution decreases, resulting in a decrease in the leaching rate. Such a decrease in the catalyst concentration is caused by consumption of ferric (III) ions in the reactions of (formula 1) and (formula 2) and generation of a copper iodide precipitate in the reaction of copper ions leached in (formula 3) and iodide ions in the leaching solution. Therefore, in the method of the present invention, it is preferable to add ferric (III) ions in an excessive amount relative to the iodide ions in the initial phase or continuously add ferric (III) ions over the course of the reaction in order to maintain an environment in which iodide ions can be oxidized into iodine in a reaction system, and to reproduce iodine from iodide ions generated in (formula 2).

The excessive ferric (III) ion content relative to the iodide ion content is specifically 23 to 120 times and preferably 35 to 120 times higher than the iodide ion content in terms of weight. In addition, the ferric (III) ion content in the leaching solution is 0.6 to 1.8 times and preferably 0.8 to 1.2 times higher than the chalcopyrite in a copper sulfide ore in terms of weight.

Ferric (III) ions that can be used are those obtained by oxidizing a raffinate (obtained as a result of recovery of valuable metals from a ferrous sulfate solution, a plating waste solution, or the like with the use of ferrous (II) ions) with the use of iron-oxidizing bacteria or by means of pH control or aeration.

Meanwhile, it is known that, in a case in which ferric (III) ions are present at a high concentration in a sulfuric acid aqueous solution serving as a leaching solution, an iron precipitate such as jarosite is generated on the ore surface so that a coating phenomenon takes place, resulting in a decrease in the leaching rate. Therefore, it is preferable that a leaching solution used in the method of the present invention further contain water-soluble ligands that strongly interact with and stabilize ferric (III) ions. Under the presence of water-soluble ligands, ferric (III) ions can be maintained in a stable form in a leaching solution such that a high leaching rate is maintained, resulting in prevention of deceleration of leaching. Herein, examples of water-soluble ligands include chloride ions and ethylene diamine tetraacetate (EDTA). The chloride ion content in a leaching solution is 0.1 to 2.3 times and preferably 0.8 to 1.7 times higher than the ferric (III) ion content in terms of weight.

BEST MODES FOR CARRYING OUT THE INVENTION

Hereinafter, the present invention is more specifically described by way of examples. However, the present invention is not limited thereto.

EXAMPLE 1

Copper Leaching Promoting Effects of Iodine, Ferric (III) Ions, and Chloride Ions A concentrate (mined in Candelaria) containing chalcopyrite as a main constituent was used as a target ore. The quality of the concentrate was as follows: Cu=28% by mass; Fe=28% by mass; and S=32% by mass.

Three grams of the above concentrate was mixed with 300 mL of a leaching solution that had been adjusted to a pH of 1.8 with sulfuric acid and poured into a 500 mL Sakaguchi flask.

Leaching solutions A to D were each prepared in a manner such that potassium iodide, ferric sulfate (III), and sodium chloride were added (or not added) to a leaching solution in the above flask at the corresponding concentrations described below. Each leaching solution was gently shaken at an ordinary temperature for leaching copper from a copper concentrate.

(Leaching Solution A)
Potassium iodide: 130 mg/L (iodide concentration: 100 mg/L)
Ferric sulfate (III): 18 g/L ($Fe^{3+}$ concentration)
Sodium chloride: 10 g/L ($Cl^-$ concentration)

(Leaching Solution B)
Potassium iodide: 0 mg/L (iodine concentration)
Ferric sulfate (III): 18 g/L ($Fe^{3+}$ concentration)
Sodium chloride: 10 g/L ($Cl^-$ concentration)

(Leaching Solution C)
Potassium iodide: 130 mg/L (iodine concentration: 100 mg/L)
Ferric sulfate (III): 18 g/L ($Fe^{3+}$ concentration)
Sodium chloride: 0 g/L ($Cl^-$ concentration)

(Leaching Solution D)
Potassium iodide: 130 mg/L (iodine concentration: 100 mg/L)
Ferric sulfate (III): 0 g/L ($Fe^{3+}$ concentration)
Sodium chloride: 10 g/L ($Cl^-$ concentration)

Time course changes in the copper concentrations in the leaching solutions A to D were determined with an ICP atomic emission spectrometer (ICP-AES). FIG. 1 shows the results for conversion of copper concentrations into percentages of leached copper.

The results show that the highest percentage of leached copper was obtained with the simultaneous addition of potassium iodide, ferric sulfate (III), and sodium chloride (leaching solution A) and the second highest percentage of leached copper was obtained even without the addition of sodium chloride (leaching solution C). On the other hand, it was found that low percentages of leached copper were obtained without the addition of potassium iodide or ferric sulfate (III) (leaching solutions B and D).

EXAMPLE 2

Copper Leaching Effects Obtained at Different Iodine Concentrations

Leaching solutions E to J were each prepared in a manner such that potassium iodide and ferric sulfate (III) were added (or not added) to a leaching solution (provided that the pH was adjusted to 1.5) in the above flask described in Example 1 at the corresponding concentrations described below. Each leaching solution was gently shaken at an ordinary temperature for leaching copper from a copper concentrate. In this Example, sodium chloride was not added.

(Leaching Solution E)
Potassium iodide: 26 mg/L (iodine concentration: 20 mg/L)
Ferric sulfate (III): 7 g/L ($Fe^{3+}$ concentration)

(Leaching Solution F)
Potassium iodide: 65 mg/L (iodine concentration: 50 mg/L)
Ferric sulfate (III): 7 g/L ($Fe^{3+}$ concentration)

(Leaching Solution G)
Potassium iodide: 130 mg/L (iodine concentration: 100 mg/L)
Ferric sulfate (III): 7 g/L ($Fe^{3+}$ concentration)

(Leaching Solution H)
Potassium iodide: 260 mg/L (iodine concentration: 200 mg/L)
Ferric sulfate (III): 7 g/L ($Fe^{3+}$ concentration)

(Leaching Solution I)
Potassium iodide: 390 mg/L (iodine concentration: 300 mg/L)
Ferric sulfate (III): 7 g/L ($Fe^{3+}$ concentration)

(Leaching Solution J)
Potassium iodide: 0 mg/L
Ferric sulfate (III): 7 g/L ($Fe^{3+}$ concentration)

Figure 2:
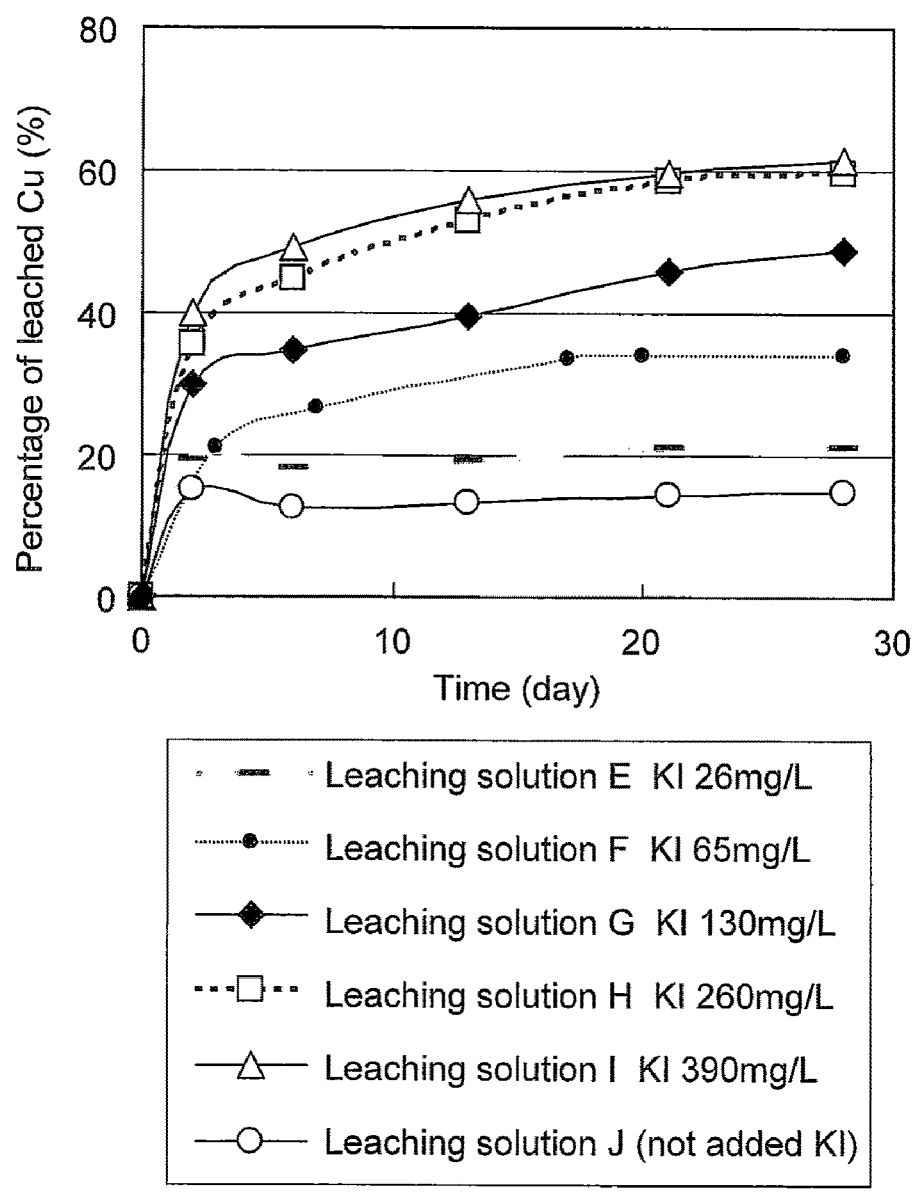
FIG. 2 shows time course changes in the percentage of leached Cu upon copper leaching with the use of leaching solutions of different iodine concentrations.

Time course changes in the copper concentrations in the leaching solutions E to J were determined with an ICP-AES. FIG. 2 shows the results for conversion of copper concentrations into percentages of leached copper.

Based on the results, it was possible to confirm that higher iodine concentrations resulted in higher leaching rates. In particular, at potassium iodide concentrations of 130 mg/L (iodine concentration: 100 mg/L) or more, copper leaching rates were improved. In addition, leaching was not decelerated. Significant effects were obtained at such concentrations (leaching solutions G, H, and I). However, at potassium iodide concentrations of 260 mg/L (iodine concentration: 200 mg/L) or more, there were no significant differences in leaching rates (leaching solutions H and I).

EXAMPLE 3

Copper Leaching Effects Obtained at Different Ferric (III) Ion Concentrations Leaching solutions K to P were each prepared in a manner such that potassium iodide and ferric sulfate (III) were added (or not added) to a leaching solution (provided that the pH was adjusted to 1.5) in the above flask described in Example 1 at the corresponding concentrations described below. Each leaching solution was gently shaken at an ordinary temperature for leaching copper from a copper concentrate. In this Example, sodium chloride was not added.

(Leaching Solution K)
Potassium iodide: 130 mg/L (iodine concentration: 100 mg/L)
Ferric sulfate (III): 18 g/L ($Fe^{3+}$ concentration) (1.8 times higher than the chalcopyrite in terms of weight)

(Leaching Solution L)
Potassium iodide: 130 mg/L (iodine concentration: 100 mg/L)
Ferric sulfate (III): 12 g/L ($Fe^{3+}$ concentration) (1.2 times higher than the chalcopyrite in terms of weight)

(Leaching Solution M)
Potassium iodide: 130 mg/L (iodine concentration: 100 mg/L)
Ferric sulfate (III): 8 g/L ($Fe^{3+}$ concentration) (0.8 times higher than the chalcopyrite in terms of weight)

(Leaching Solution N)
Potassium iodide: 130 mg/L (iodine concentration: 100 mg/L)
Ferric sulfate (III): 3 g/L ($Fe^{3+}$ concentration) (0.3 times higher than the chalcopyrite in terms of weight)
(Leaching Solution O)
Potassium iodide: 130 mg/L (iodine concentration: 100 mg/L)
Ferric sulfate (III): initial concentration: 8 g/L ($Fe^{3+}$ concentration) (0.8 times higher than the chalcopyrite in terms of weight) increased by 0.2 g/L ($Fe^{3+}$ concentration) every 7 days
(Leaching Solution P)
Potassium iodide: 130 mg/L (iodine concentration: 100 mg/L)
Ferric sulfate (III): 0 g/L ($Fe^{3+}$ concentration)

Figure 3:
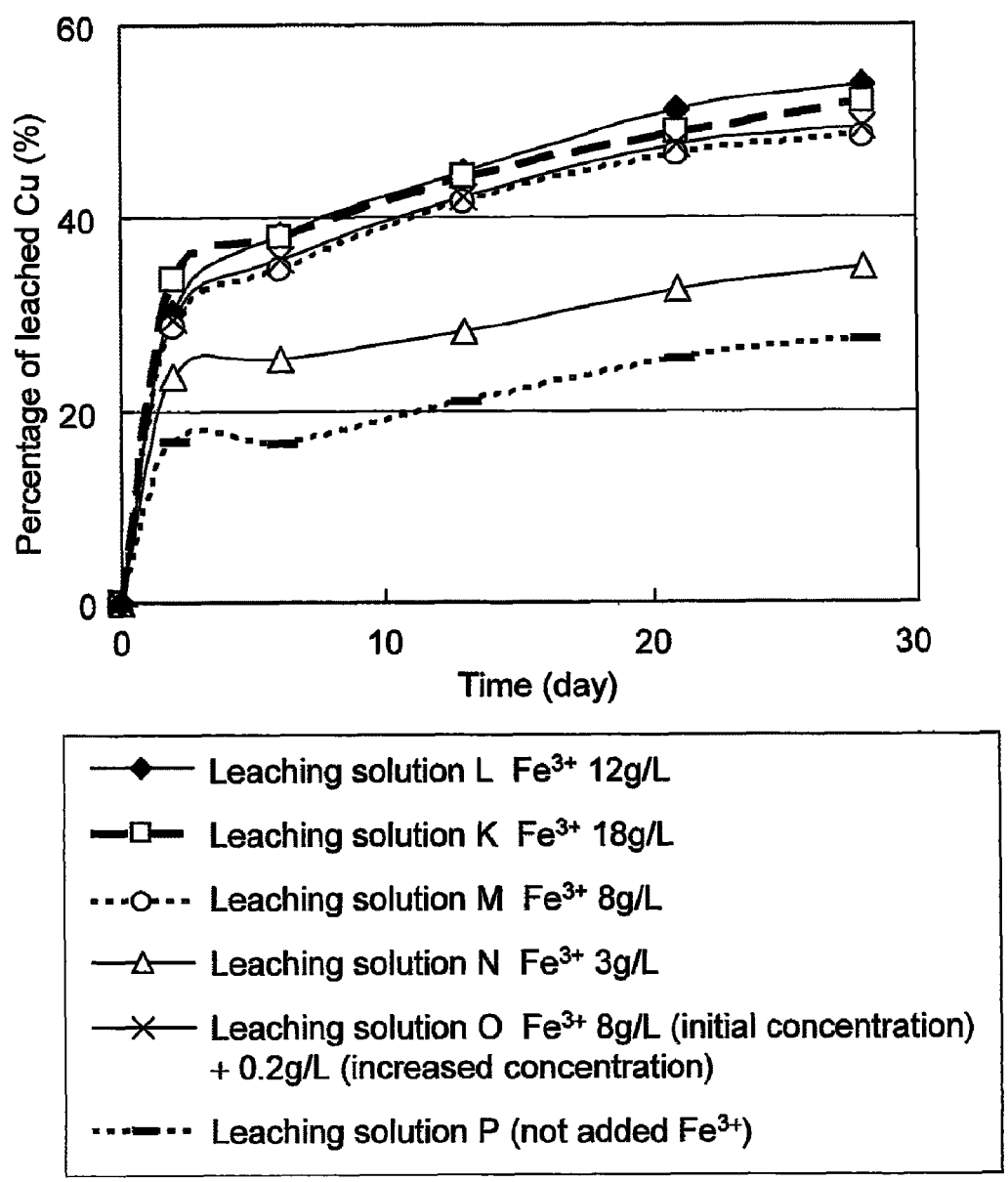
FIG. 3 shows time course changes in the percentage of leached Cu upon copper leaching with the use of leaching solutions of different $Fe^{3+}$ concentrations.

Time course changes in the copper concentrations in the leaching solutions K to P were determined with an ICP-AES. FIG. 3 shows the results for conversion of copper concentrations into percentages leached copper.

Consequently, chalcopyrite leaching efficiently proceeded at each $Fe^{3+}$ concentration in the initial phase, except for when the $Fe^{3+}$ concentration was 0 g/L (not added) (leaching solution P). However, it was found that leaching tended to be decelerated after the elapse of a certain period of time. In addition, the leaching rate tended to increase at higher $Fe^{3+}$ concentrations. Such effects were significantly observed when the concentration was 8 g/L or more (and not less than 0.8 times higher than the chalcopyrite in terms of weight) (regarding leaching solutions K, L, and M). Further, comparable results were obtained in a case in which $Fe^{3+}$ was added in the initial phase (to leaching solution M) and in a case in which $Fe^{3+}$ was continuously added during leaching (to leaching solution O).

EXAMPLE 4

Copper Leaching Effects Obtained at Different Chloride Ion Concentrations

Leaching solutions Q to W were each prepared in a manner such that potassium iodide, ferric sulfate (III), and sodium chloride were added to a leaching solution (provided that the pH was adjusted to 1.5) in the above flask described in Example 1 at the corresponding concentrations described below. Each leaching solution was slowly shaken at an ordinary temperature for leaching copper from a copper concentrate.
(Leaching Solution Q)
Potassium iodide: 130 mg/L (iodine concentration: 100 mg/L)
Ferric sulfate (III): 12 g/L ($Fe^{3+}$ concentration)
Sodium chloride: 16.5 g/L ($Cl^-$ concentration: 10 g/L)
(Leaching Solution R)
Potassium iodide: 130 mg/L (iodine concentration: 100 mg/L)
Ferric sulfate (III): 12 g/L ($Fe^{3+}$ concentration)
Sodium chloride: 33 g/L ($Cl^-$ concentration: 20 g/L)
(Leaching Solution S)
Potassium iodide: 130 mg/L (iodine concentration: 100 mg/L)
Ferric sulfate (III): 12 g/L ($Fe^{3+}$ concentration)
Sodium chloride: 45 g/L ($Cl^-$ concentration: 27 g/L)
(Leaching Solution T)
Potassium iodide: 130 mg/L (iodine concentration: 100 mg/L)
Ferric sulfate (III): 12 g/L ($Fe^{3+}$ concentration)
Sodium chloride: 8 g/L ($Cl^-$ concentration: 5 g/L)
(Leaching Solution U)
Potassium iodide: 130 mg/L (iodine concentration: 100 mg/L)
Ferric sulfate (III): 12 g/L ($Fe^{3+}$ concentration)
Sodium chloride: 4 g/L ($Cl^-$ concentration: 2.5 g/L)
(Leaching Solution V)
Potassium iodide: 130 mg/L (iodine concentration: 100 mg/L)
Ferric sulfate (III): 12 g/L ($Fe^{3+}$ concentration)
Sodium chloride: 2 g/L ($Cl^-$ concentration: 1.25 g/L)
(Leaching Solution W)
Potassium iodide: 130 mg/L (iodine concentration: 100 mg/L)
Ferric sulfate (III): 12 g/L ($Fe^{3+}$ concentration)
Sodium chloride: 0 g/L ($Cl^-$ concentration: 0 g/L)

Figure 4:
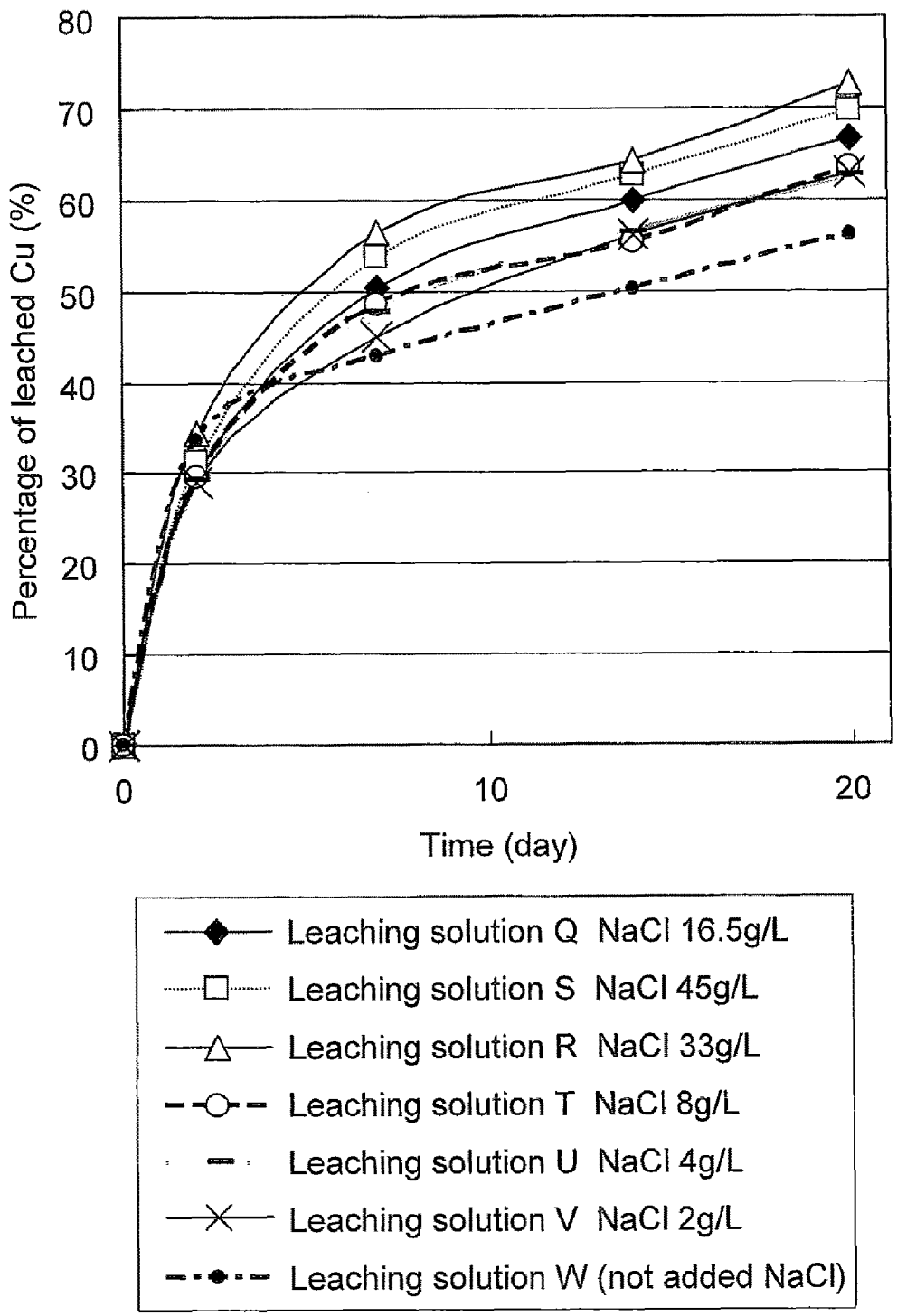
FIG. 4 shows time course changes in the percentage of leached Cu upon copper leaching with the use of leaching solutions of different chloride ion concentrations.

Time course changes in the copper concentrations in the leaching solutions Q to W were determined with an ICP-AES. FIG. 4 shows the results for conversion of copper concentrations into percentages of leached copper.

It has been found that the copper leaching promoting effects obtained with the addition of iodine and $Fe^{3+}$ can be further improved with the addition of chloride ions ($Cl^-$) that coordinate with $Fe^{3+}$. Also, the copper leaching promoting effects were observed when the NaCl concentration was 2 g/L or more (corresponding to the $Cl^-$ content that was 0.1 times higher than the $Fe^{3+}$ content in terms of weight), and such effects were observed particularly when the NaCl concentration was 16.5 g/L or more (corresponding to the $Cl^-$ content that was 0.8 times higher than the $Fe^{3+}$ content in terms of weight) (in the leaching solutions Q to V).

Industrial Applicability

According to the method of the present invention, copper can be efficiently leached from a copper sulfide ore comprising chalcopyrite or enargite at an ordinary temperature. In the method the present invention, a sulfuric acid solution containing iodide ions and ferric (III) ions in an excessive amount relative to the iodide ions is used as a leaching solution, such that a reaction system, in which iodine or tri-iodide ions capable of serving as catalysts for a reaction for dissolving a copper sulfide ore are reproduced and continuously supplied, is established. As a result, the copper leaching rate can be significantly improved. In addition, the leaching solution is allowed to contain water-soluble ligands that can stabilize ferric (III) ions, so that iron precipitate generation is suppressed and thus deceleration of leaching can be prevented.

All publications, patents, and patent applications cited herein are incorporated herein by reference in their entirety.

What is claimed is:

1. A method of recovering copper from copper sulfide ores, characterized by comprising using, as a leaching solution, a sulfuric acid solution containing iodide ions and ferric (III) ions in a substantially greater amount relative to the iodide ions, and leaching copper from a copper sulfide ore.

2. The method according to claim 1, wherein the copper sulfide ore is a copper sulfide ore containing chalcopyrite or enargite as a main constituent.

3. The method according to claim 1 or 2, wherein the total iodine concentration derived from iodide ions in the leaching solution and iodine and/or tri-iodide ions generated by oxidation of the iodide ions is 100 to 300 mg/L.

4. The method according to claim 1, wherein the ferric (III) ion content in the leaching solution is 23 to 120 times higher than the iodide ion content therein in terms of weight.

5. The method according to claim 1, wherein the ferric (III) ion content in the leaching solution is 0.6 to 1.8 times higher than the chalcopyrite in the copper sulfide ore in terms of weight.

6. The method according to claim 1, wherein the leaching solution further contains water-soluble ligands that can stabilize ferric (III) ions.

7. The method according to claim 6, wherein the water-soluble ligands are chloride ions.

8. The method according to claim 7, wherein the chloride ion content in the leaching solution is 0.1 to 2.3 times higher than the ferric (III) ion content therein in terms of weight.

* * * * *